Jan. 31, 1939.    R. D. HILL    2,145,304
OIL FILTER
Filed July 6, 1937

INVENTOR.
ROLO D. HILL
BY Hazard and Miller
ATTORNEYS.

Patented Jan. 31, 1939

2,145,304

UNITED STATES PATENT OFFICE 2,145,304

OIL FILTER

Rolo D. Hill, Los Angeles, Calif., assignor of one-half to Guy S. Tucker, Los Angeles, Calif.

Application July 6, 1937, Serial No. 152,123

3 Claims. (Cl. 210—112)

This invention relates to filters and particularly to filters used for filtering oil such as those employed for filtering the oil in internal combustion engine lubricating systems.

An object of the invention is to provide an improved oil filter in the form of a container containing a filtering medium wherein the cover or one wall of the container forms a fitting adapted to be permanently installed or inserted in an oil conduit, the container being detachably connected thereto so as to permit its removal and replacement of the filtering medium from time to time without disturbing the connections with the oil conduit.

Another object of the invention is to provide an improved filter wherein the filtering medium is so arranged as to have a maximum efficiency. In filters the maximum filtering or extraction of solids and semi-solids from the liquid usually takes place at the surface or at the point where the liquid first enters the filtering medium. The improved filter has the filtering medium so arranged as to present a large external surface where the oil first enters the filtering medium and on which the maximum extraction of solids and semi-solids takes place. After passing through this surface where the major extraction takes place, the requirement for additional filtering medium continually decreases and the improved filter has its filtering medium so arranged that the volume of filtering medium through which the liquid is caused to pass after penetrating the large external surface continually decreases and in this way, with a given volume of filtering medium, a maximum efficiency is possible.

A further object of the invention is to provide an improved filter for filtering oil or like substances having a visible indicator indicating whether or not the filter has become clogged to such an extent that liquid cannot readily pass therethrough and also indicating the nature and condition of the oil or other liquid that has been filtered.

Another object of the invention is to provide a filter wherein provision is made for the extraction of the water content from the system. In the oil generally used for crankcase lubrication in automobiles there is usually present a small percentage of water emulsified with the oil. When this oil heated to the crankcase temperature is passed through a filter and is subsequently returned to a crankcase, there is a tendency for the emulsified water content to separate and to be returned to the crankcase as separated or free water mixed with the oil. This separated water is apt to bring about dangerous consequences and the present filter provides a means whereby an opportunity is afforded for the water to separate and to be collected and to be thus retained out of the lubrication system.

With the foregoing and other objects in view, which will be made manifest in the following detailed description and specifically pointed out in the appended claims, reference is had to the accompanying drawing for an illustrative embodiment of the invention, wherein:

Figure 1:
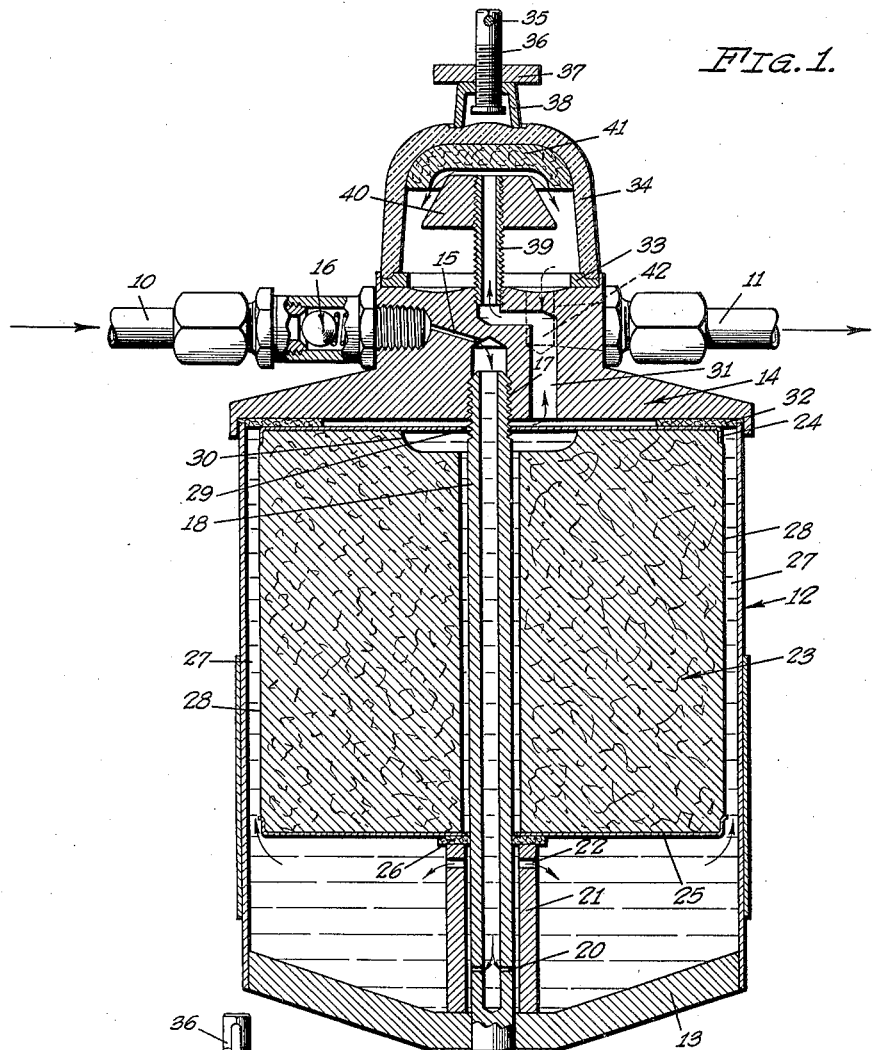
Fig. 1 is a vertical section through the preferred form of filter embodying the present invention.

Referring to the accompanying drawing wherein similar reference characters designate similar parts throughout, 10 designates a section of tubing that conveys oil from the crankcase of an internal combustion engine such as that of an automobile. The oil is delivered therethrough from the oil pump to the filter. After being filtered the oil is returned to the crankcase through a similar conduit 11.

The filter comprises a container 12 having cylindrical walls in the preferred form and a conical bottom 13. It is provided with a cover 14 that constitutes a fitting adapted to be permanently installed or inserted in the oil conduit formed by sections of tubing 10 and 11. The cover 14 has an inlet 15 through which the oil is delivered and in the preferred form of construction a check valve 16 is installed in this inlet or otherwise located in tubing 10 so as to prevent reverse flow through the tubing. Centrally of the cover 14 there is a drilled and tapped hole 17 into which is screwed the top of a tube 18 which extends upwardly through the bottom 13 of the container and which is provided with a handle 19. This tube serves to convey incoming oil to a point adjacent the bottom of the container where it discharges through small apertures 20 inside of a spaced sleeve or bushing 21 having one or more apertures 22. The spaced sleeve or bushing 21 serves to support the bottom of the filtering medium generally indicated at 23 which may be of fibrous material or any preferred filter. Sheet metal caps or plates fit over the top and bottom of the filtering medium as indicated at 24 and 25, respectively. Lower cap is supported on a gasket 26 which rests on top of the sleeve 21.

The filtering medium is cylindrical in form having a central aperture therethrough, the walls of which are spaced from the external surface of the tube 18 as indicated at 27. The peripheral or cylindrical surface of the filtering medium is also spaced from the walls of the container as indicated at 28. The bottom cap 25 and gasket 26 constitute a means for preventing ingress of oil to space 27 except through the filtering medium from a peripheral surface. The upper cap 24 resting on top of the filtering medium has a central aperture therethrough as indicated at 29 which provides for egress of filtered oil from space 27 which is enlarged at the top as indicated at 30 to an outlet 31. A gasket 32 is positioned against the bottom of cap or cover 14 and is engaged by the upper rim of the container 12 and by the upper cap 24. The filter medium is normally of such a height that when it is resting on gasket 26 it projects slightly above the rim of the container so that when the parts are assembled and tube 28 is rotated by handle 19 in screwing it into hole 17 the filter medium will be compressed slightly and the gasket 32 will not only be engaged by the rim of the container but will be firmly engaged by the upper cap 24. The two caps 24 and 25, perform the additional function of tending to hold the filter medium 23 concentrically within the container and around tube 18 when the structure is assembled.

On the top of cover 14 there is positioned a gasket 33 engageable by the rim of an inverted glass cup 34 which is held in place by a bail 35 having a screw 36 on which is a nut 37 adapted to be tightened against a cap 38. Within this glass cup there is disposed a threaded member 39 on which is a conical head 40. On the top of the cup there is disposed a layer 41 of fibrous material. The filtered oil issuing through outlet 31 passes up through nipple 39 and spreads out on the conical head 40 and on dripping therefrom is collected and drains through an outlet 42 leading to tube 11.

The operation and advantages of the improved filter are as follows: The oil to be filtered enters through tube 10 past check valve 16, and is conveyed to a point adjacent the bottom of the container beneath the filter medium. Such solids or semi-solids as tend to settle out by gravity may settle in the container beneath the filter medium. The velocity of the oil on issuing through ports 20 and 22 is materially reduced. It then may pass up through space 28 and enter the filter medium through its peripheral surface. As this surface is relatively large for the volume of filter medium employed it affords a large area on which the major portion of the solids or semi-solids may collect. The oil, as it is thus filtered or cleaned, percolates through the fibrous material and is re-collected in space 27 where it passes up through the cover to the indicator. The oil spreading on the conical member 40 and dripping therefrom is visible through the glass walls of cap 34 so that it can be ascertained at all times whether the filter is functioning properly. The condition of the filtered oil can also be readily ascertained.

As the oil is delivered to the filter at crankcase temperature and usually contains a small amount of water in emulsification the oil on being delivered through the relatively cool chamber formed by cap 34 tends to have the water separate out. The water vaporizes at this point and tends to settle as a fog on the top of cap 34. The function of the fibrous material 41 is to collect and absorb this condensed water vapor and prevent its being returned with the oil to the crankcase. The oil dripping from the conical head or spreader 40 collects and flows through the outlet 42 into tube 11 to be returned to the crankcase.

The conical head or spreader 40 has its top surface positioned a sufficient distance below the fibrous material pad 41 so that the oil in spreading laterally from the tube 39 over the top surface of the spreader does not come in direct contact with the absorbent pad. Although the oil is fed or supplied through the tube 10 under pressure in order to force this oil through the filter, nevertheless the outlet from the inverted cup 34 to the oil tube 11 is of sufficient size and the flow is to the crankcase of the engine, hence there is practically no back pressure causing the cup 34 to fill with oil. Therefore this cup merely has a dripping shower of oil and where water vapor is present in the oil, this vapor condenses in the form of a fog or visible droplets in the cup, this vapor being warm rises in the cup and is absorbed in the pad 41. When the pad absorbs practically all of the water it can contain, small droplets will be noted running down the sides of the cup 34 in which case the cup should be removed and a dry pad substituted for the saturated pad 41. The moist pad after drying may then be retained to be again replaced. It is essential in this type of absorption of water vapor that the oil does not contact the pad 41 as it would have an effect of sealing the outside pores and preventing proper absorption of the water vapor.

The function of check valve 16 is to prevent any reverse flow through the inlet 10. Some considerable pressure is built up in the filter during operation and if it were not for the presence of the check valve there might be a tendency for this pressure to bring about a reverse flow when the engine is stopped. The check valve prevents this reverse flow and any possibility of collected or separated solid material being forced back into the crankcase through inlet 10.

Figures 2, 3:
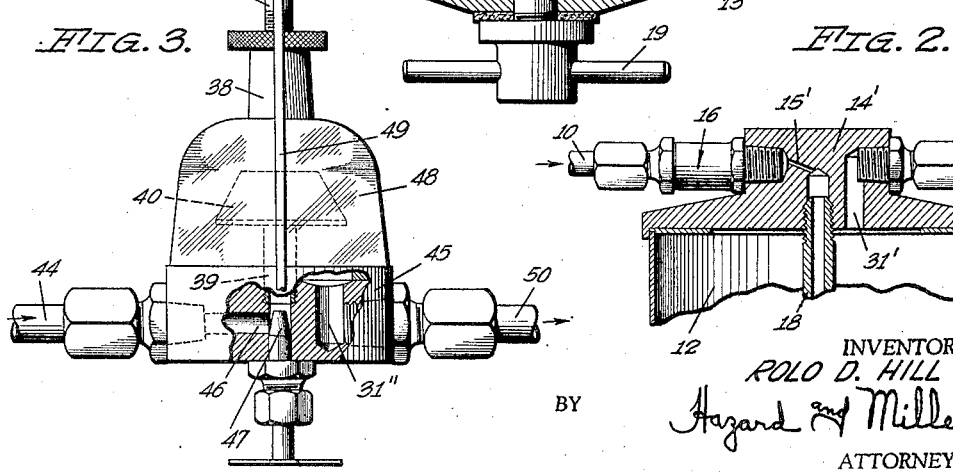
Fig. 2 is a section of the upper part of the filter of a type used with a remote indicator.
Fig. 3 is an elevation with parts broken away of an indicator of the filter which may be used with the filter connection of Fig. 2 and if desired, remote from the filter.

It is not necessary to have the indicator for the filter mounted on the cover 14 as shown on Fig. 1. If desired, this indicator may be disposed remote therefrom as indicated by Figs. 2 and 3. In such event the outlet 31" is connected by means of tube 44 to a base 45 which may be remotely located such as for example, on the dashboard of the vehicle. This tubing may lead to an inlet 46 controlled by needle valve 47. On the base there is mounted a glass cap 48 corresponding to cap 34 which is secured in place as by bail 49 and attendant construction. The cap encloses an upstanding nipple provided with a conical head or spreader 40 and a layer of fibrous material as shown at 41.

The operation of the indicator shown in Fig. 2 is the same as that previously described, conveying the oil ultimately to tubing 50 which may return it to the crankcase.

From time to time the filtering medium 23 must be replaced. This can be easily accomplished without disturbing the connections with the oil conduit. Tube 18 is merely unscrewed by means of handle 19 which detaches the container from the cover 14. This enables the filter medium to be removed and replaced and the bottom of the container to be cleaned out. Also, occasion may require from time to time the removal of cap 34 and the replacement of the water absorbing fibrous layer indicated at 41.

From the above-described construction it will be appreciated that the improved filter is of relatively simple and durable design enabling easy and quick replacements of the filter medium without disturbing in any way connections with the oil conduit. The design of the filter is such as to afford a relatively large area that the oil must initially penetrate and as all oil must pass through a thickness of filter medium approximately equal to the radius of the filter there is less opportunity for channeling to take place. Not only is provision made for ascertaining at all times whether the filter is operating properly but an opportunity is also afforded for inspecting at all times the nature and condition of the filtered oil.

When it is desired to use the filter indicator remote from the filter for instance for maintaining this in a position readily visible to the driver of an automobile or the operator of an engine, the upper portion of the filter is modified as shown in Fig. 2. This employs a cover 14' which omits the mounting for the visible filter. The inlet 15' from the tube 11 employs a check valve 16 similar to that of Fig. 1. The filtered oil is led directly by the outlet 31' to the tube 44 which leads to the filter assembly shown in Fig. 3. This may be constructed substantially as described above.

Various changes may be made in the details of construction without departing from the spirit or scope of the invention as defined by the appended claims.

I claim:

1. An oil filter comprising in combination an upper cover having inlet and outlet means for oil, a tube connected to the inlet and extending downwardly below the cover, a container having a bottom, a connecting means between the tube and the said bottom to attach the container to the cover, there being a sealing means between the cover and the container, a cylindrical porous filter medium having an impervious bottom cap, means to support said filter and means forming an oil seal between the cover and the upper surface of the filter medium, said filter medium having a central axial opening from end to end with a communication to the oil outlet in the cover, an oil flow means for directing oil flowing downwardly through the said tube to a position between the bottom of the container and the impervious bottom cap, there being an annular space between the periphery of the filter medium and the wall of the container, the oil being adapted to flow radially from the said latter space to the central opening and thence to the outlet, the cover having a transparent inverted cup mounted thereon, the oil outlet including a vertical oil flow tube with a spreader forming a frustum of a cone extending upwardly into the cup, a layer of fibrous water absorbent material positioned at the top of the inverted cup above the spreader whereby the oil and water vapor is discharged between the spreader and the said fibrous layer.

2. An oil filter comprising in combination a cover having an inlet and an outlet means for oil, a tube extending downwardly from the cover connecting to the inlet and having a detachable connection to the cover, a container having a bottom, the tube extending through the bottom, a perforated sleeve surrounding the lower portion of the tube, there being perforations in the tube communicating with the space between the tube and the said sleeve, a handle structure on the tube to engage the said bottom and thereby attach the container to the cover, a cylindrical fibrous filter unit having a central opening concentric with the tube but spaced therefrom, means forming a liquid tight seal between the sleeve and the lower end of the filter unit and the said tube, there being a space at the upper end of the filter unit communicating with the oil outlet and means forming an oil seal between the upper surface of the unit and the cover outside of the said latter space, the periphery of the unit being spaced from the walls of the container and there being a sediment space between the bottom of the unit and the bottom of the container, the oil being adapted to flow downwardly through the said tube into the sediment space and from the space surrounding the periphery of the unit radially through the unit to the central opening and thence to the outlet.

3. In a device as described, a supporting structure having an inlet and an outlet for oil, an inverted cup structure mounted thereon, a vertical oil tube connected to the inlet and extending upwardly in the inverted cup structure and provided at the top with the frustum of a cone, the top of the cup having a layer of absorbent material above the apex of the frustum of the cone whereby oil discharges over the top of the frustum and the water vapor collects in the upper part of the inverted cup being absorbed in the absorbent material, the outlet for oil having a connection to the inverted cup of sufficient size to prevent accumulation of oil in the inverted cup.

ROLO D. HILL.